(12) United States Patent
Laffisse et al.

(10) Patent No.: US 6,276,640 B1
(45) Date of Patent: Aug. 21, 2001

(54) DEVICE FOR ASSISTING WITH RETRIMMING AN AIRCRAFT CONTROL

(75) Inventors: Jean-François Laffisse, Marseilles; Eddy Gaston Jean Woirin, Velaux, both of (FR)

(73) Assignee: Eurocopter, Marignane Cedex (FR)

( * ) Notice: Subject to any disclaimer, the term of this patent is extended or adjusted under 35 U.S.C. 154(b) by 0 days.

(21) Appl. No.: 09/471,134

(22) Filed: Dec. 23, 1999

(30) Foreign Application Priority Data

Dec. 24, 1998 (FR) .................................................. 98 16423

(51) Int. Cl.⁷ .................................................. B64C 13/08
(52) U.S. Cl. .......................... 244/178; 244/236; 244/221
(58) Field of Search .................................. 244/17.13, 178, 244/221, 228, 230, 194, 195, 197, 236; 701/4, 8; 318/584

(56) References Cited

U.S. PATENT DOCUMENTS

| 3,700,995 | * | 10/1972 | Parkinson et al. . |
| 3,719,336 | * | 3/1973 | Fowler et al. . |
| 3,920,966 | * | 11/1975 | Knemeyer et al. . |
| 4,198,017 | * | 4/1980 | Murray . |
| 4,385,355 | * | 5/1983 | Verzella et al. . |
| 4,500,967 | * | 2/1985 | Murphy et al. . |
| 4,676,460 | * | 6/1987 | Hagy et al. . |
| 4,758,958 | * | 7/1988 | Von Gersdorff . |

FOREIGN PATENT DOCUMENTS

| 0031619 | 7/1981 | (EP) . |
| 2274971 | 1/1976 | (FR) . |

OTHER PUBLICATIONS

French Search Report dated Sep. 10, 1999.

* cited by examiner

*Primary Examiner*—Charles T. Jordan
*Assistant Examiner*—Tien Dinh
(74) *Attorney, Agent, or Firm*—Stevens, Davis, Miller & Mosher, LLP

(57) ABSTRACT

A device for re-trimming a pilot control of an aircraft to keep a flight parameter at a reference value includes a first detection means for detecting the actual position of the pilot control, a calculation unit for determining the direction and magnitude of displacement of the control in order to re-trim the control based on the actual position and reference position, and a display structure for displaying to the pilot a characteristic sign indicating the direction and magnitude of the displacement needed to re-trim the control.

10 Claims, 2 Drawing Sheets

DEVICE FOR ASSISTING WITH RETRIMMING AN AIRCRAFT CONTROL

Figure 1:
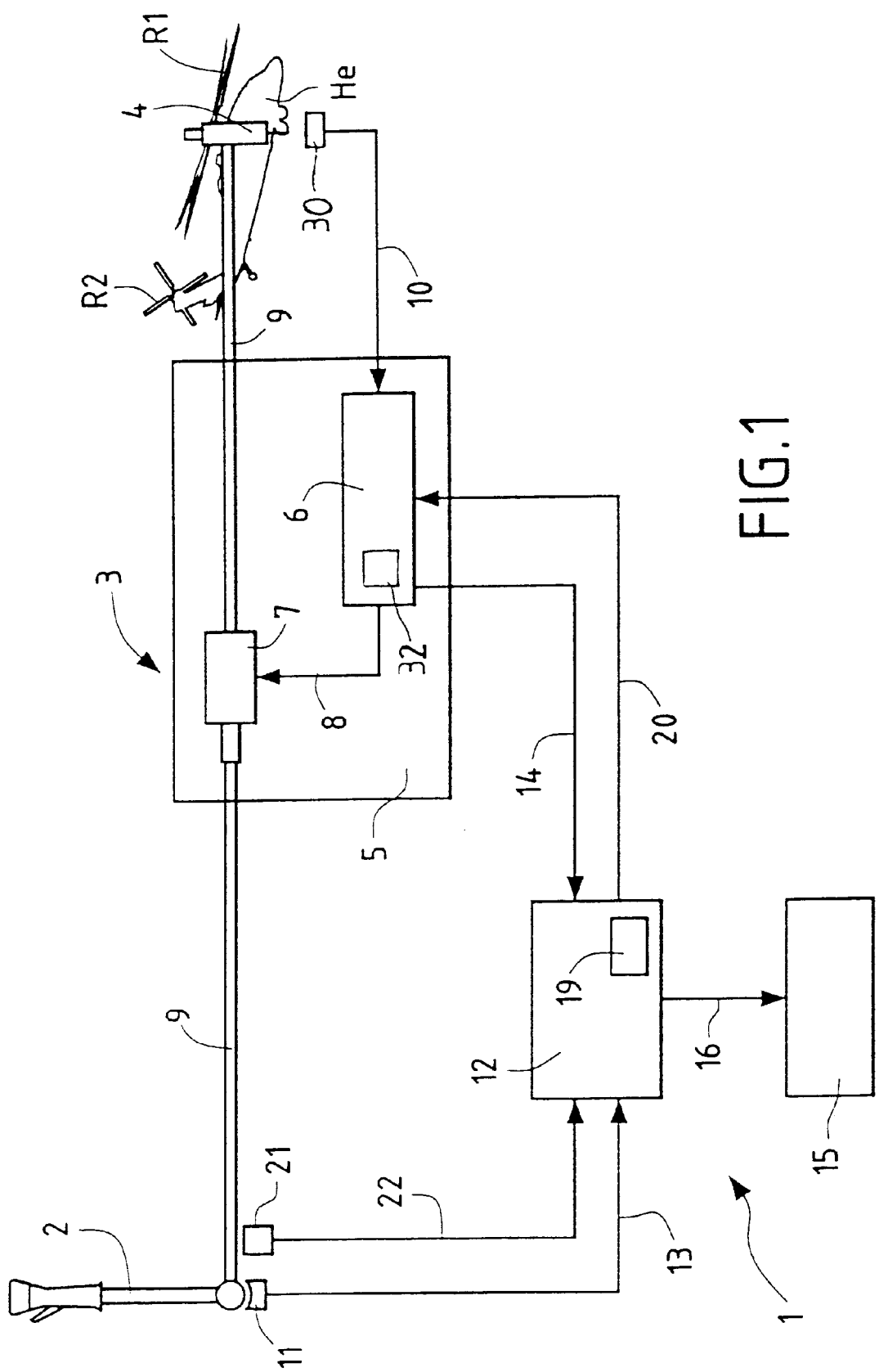

The present invention relates to a device for assisting with retrimming an aircraft control.

It applies more particularly to an aircraft, especially a helicopter, comprising a flight-control device which comprises, in particular:

said control, for example, in the case of a helicopter, a collective pitch lever, a cyclic pitch stick or a rudder bar, which can be actuated by a pilot of the aircraft with a view to controlling a controlled member, particularly a servocontrol for the main lift and forward travel rotor or for the antitorque tail rotor, of the helicopter; and a flight-assistance system which is connected to said control and which is intended to determine a command and apply it to said controlled member so that the action of said controlled member allows a flight parameter to be kept at a reference value. As far as said flight parameter is concerned, it may, in particular, be the attitude, speed, altitude, etc., of the aircraft.

In the context of the present invention, said flight-assistance system may be an electrical flight-control device or may include an automatic pilot.

It is known that, in the case of an aircraft fitted with an automatic pilot (with rams mounted in series in the flight controls and possibly parallel rams known as TRIM or compensating rams, connected to the computer of the automatic pilot), the latter, through a series ram, adds to the command generated by operation of the control, an additional command, the purpose of which is to maintain an objective, that is to say keep a flight parameter at a reference value. Said command and said additional command are then transmitted to one or more servocontrols of the controlled member It is known that, in order to prevent an aircraft and particularly a helicopter from getting into a flight configuration from which the pilot cannot recover it, particularly in the event of an uncontrolled full stroke of the ram, the authority of the ram or rams used is limited to a few percent, generally to a value below 15%.

In consequence, because of this limited authority, it is often impossible, in practice, to maintain an objective of the aforementioned type without retrimming the control with a view to reducing the authority demanded of the flight-assistance system and therefore of the ram.

By way of illustration, consider a helicopter with an automatic pilot and flying at 10 km/h, the automatic pilot having the objective of maintaining a 10° nose-down attitude when accelerating up to 200 km/h, for example. Assuming that the control or stick remains stationary, to maintain a 10° nose-down attitude throughout the acceleration phase, the automatic pilot needs to add an increasing command to the pitch command in order to counter the static change in the command which is due to the increase in speed. The command that has to be added between 10 km/h and 200 km/h is of the order of a few tens of percent.

It is therefore not possible, for the automatic pilot associated with a series ram with authority limited to a few percent, to maintain such a 10° nose-down attitude up to 200 km/h, starting from 10 km/h This problem can be solved by an appropriate displacement of the control so as to retrim it with regard to maintaining the aforementioned objective, that is to say, in the context of the present invention, so as to bring it into a position for which the command generated by said control allows the flight parameter in question (the nose-down attitude, in the aforementioned example) to be brought to the reference value or to a value close to it (10° in said example).

However, such a retrimming displacement demands work of the pilot, which work it was wished to avoid by action of the automatic pilot.

A system for the motorized displacement of the control, intended to displace the latter in order to retrim it, is known.

However, a known system of this kind has drawbacks, particularly:

it requires means (and, in particular, a motor) which are relatively bulky;

it is expensive; and it contains numerous parts which are liable to break down.

The object of the present invention is to overcome these drawbacks. The invention relates to an inexpensive and not very bulky device for assisting a pilot of an aircraft in simply and effectively retrimming a control.

To this end, according to the invention, said device of the type comprising a flight-control device which comprises, in particular:

said control which can be actuated by a pilot of the aircraft with a view to controlling a controlled member of the aircraft; and a flight-assistance system which is connected to said control and which is intended to determine an additional command and apply it to said controlled member so that the action of said controlled member allows a flight parameter to be kept at a reference value is noteworthy in that it comprises:

at least one first detection means for detecting the actual position of said control;

a calculation unit for determining the direction and magnitude of displacement of said control so as to retrim it, on the basis of said actual position detected by the detection means and a reference position of said control, corresponding to the latter being in the trimmed position with regards to keeping said flight parameter at said reference value; and a display means capable of displaying to said pilot of the aircraft at least one characteristic sign indicating the direction and magnitude of the displacement of the control that is needed for retrimming it.

Thus, by virtue of the invention, the aircraft pilot knows precisely the direction and magnitude of displacement needed to retrim the control, with a view to reducing the authority demanded of the flight-assistance system, which makes it possible to retrim precisely and quickly and to overcome the aforementioned drawbacks.

Furthermore, as the retrimming action is performed manually and therefore requires no special-purpose (mechanical, hydraulic, etc.) means, the risk of breakdown, the bulk and the cost of the device according to the invention are very low.

In addition, the retrimming action which consists in simply displacing the control requires only a small amount of work on the part of the pilot.

Of course, the device according to the invention may be applied to an aircraft which has no system for displacing the control. However, it may also be applied to an aircraft which is fitted with a motorized displacement system like the aforementioned one. In this case, the device according to the invention can be made active either at the same time as said known system, possibly by providing means which give priority to one or other of them, or as a supplement for said system, to remedy breakdown thereof.

Incidentally, the device according to the invention advantageously comprises a means for minimizing or even completely inhibiting any change in said reference value of the flight parameter considered during manual action of retrimming the control, it being possible, for example, for such an action to be detected by a second special-purpose detection means so that the status of the aircraft changes as little as possible during retrimming. It is thus possible, during retrimming, to avoid a change in flight configuration which is likely to be brought about by a simultaneous change in the flight parameter and in the position of the control, such a change, of course, not being desired by the pilot who is then demanding only a retrimming action.

As a preference, said second detection means is formed in such a way as to detect at least one of the following parameters:

in the case of a control equipped with an anchoring means, the angular difference between the actual position and the anchored position of said control;

the force exerted by a pilot on the control; and actuation by a pilot of a special-purpose actuating means intended to inform of the taking of manual retrimming action.

Furthermore, advantageously, the device according to the invention comprises a third means for reducing the authority demanded by the flight-assistance system during a manual retrimming action.

Furthermore, advantageously, said display means is formed in such a way as to display the characteristic sign or signs only when the magnitude of the retrimming displacement exceeds a predefined magnitude, which makes it possible to avoid systematically displaying the retrimming symbols. Furthermore, to avoid fleeting displays, said characteristic sign or signs are displayed only when the magnitude of the retrimming displacement has exceeded a predefined magnitude for at least a predefined length of time.

The figures of the appended drawing will make it easy to understand how the invention may be embodied. In these figures, identical references denote similar elements.

FIG. 1 diagrammatically illustrates a retrimming-assistance device according to the invention, mounted on a helicopter.

Figure 2A:
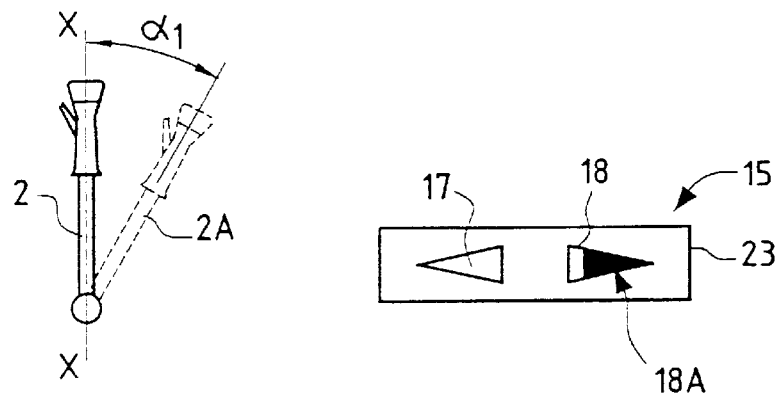
Figure 2B:
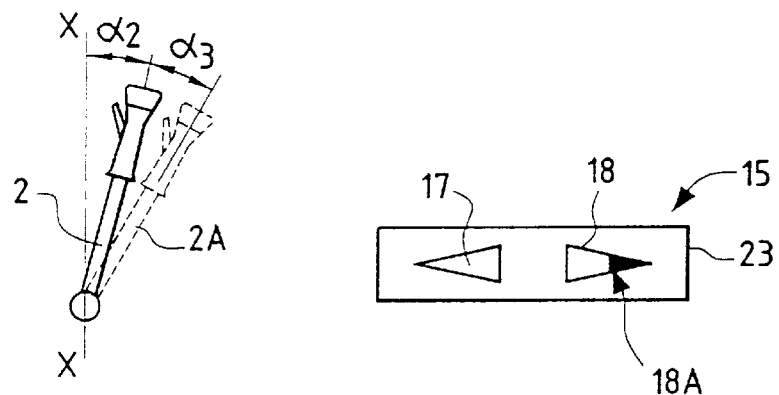
Figure 2C:
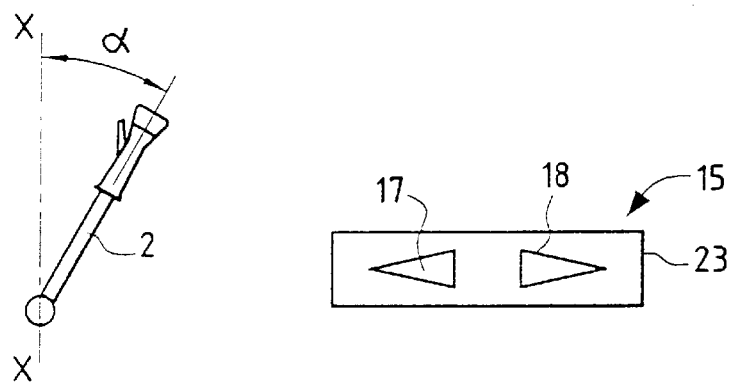

FIGS. 2A, 2B and 2C respectively depict successive stages in retrimming according to the invention and thus show, on the left-hand side, the position of a control and, on the right-hand side, a display means illustrating said position of the control.

The device 1 according to the invention and depicted diagrammatically in FIG. 1 is intended to assist a pilot with retrimming a flight control 2 of an aircraft, in this particular instance of a helicopter He.

Said device 1 is associated with a device 3 for controlling the flight of the helicopter He. Said devices 1 and 3 are of course on board the helicopter He although, for the clarity of the drawing, the helicopter He is depicted on a smaller scale outside said devices 1 and 3 in FIG. 1.

As is known, said flight-control device 3 comprises:

said control 2, which is depicted in the form of a pivoting stick in FIG. 1 and which can be operated by a pilot of the helicopter He with a view to controlling a controlled member, namely a means 4, particularly a servocontrol for actuating a main lift and forward travel rotor R1 of the helicopter He which also has an antitorque tail rotor R2. The control may also be a rudder bar or a ministick; and a flight-assistance system 5 which is connected to said control 2 and which is intended to determine a command and apply it to said controlled member 4 so that the action of said controlled member 4 allows a flight parameter to be kept at a reference value.

As regards the flight parameter that is to be kept at a reference value, this may, in particular, be the attitude, heading, roll, speed or altitude, etc., of the helicopter He.

In the context of the present invention, said system 5 may be an electric or optic flight-control device in which the static commands from algorithms for maintaining objectives need to be retrimmed.

However, in the example depicted in FIG. 1, the device 1 according to the invention is applied to a helicopter He equipped with an automatic pilot 6. In this case, the system 5 comprises, in the usual way, in addition to the automatic pilot 6, a ram 7 which is connected to said automatic pilot 6 by a link 8 and which is built into a linkage 9 connecting the control 2 to the means 4. In addition, sensors 30 which sense the behavior of the helicopter are connected by a link 10 to the automatic pilot 6.

In the known way, the flight-control device 3 allows the following to be applied simultaneously to the means 4:

a first command representing the position of the control 2 and applied directly to the linkage 9; and a second command generated by the automatic pilot 6 and applied to the linkage 9 via the ram 7.

This second command is intended to allow an objective to be maintained and, more specifically, to allow a flight parameter, for example the roll of the helicopter He, to be kept at a reference value, for example 15°.

According to the invention, in order to assist the pilot with retrimming the control 2, with a view to reducing the magnitude of the action demanded of the system 5 while at the same time maintaining the relevant objective, the device 1 comprises:

a detection means 11 for detecting the actual position of said control 2;

a calculation unit 12 connected by links 13 and 14 to, respectively, said detection means 11 and the automatic pilot 6, so as to determine the direction and magnitude of displacement of said control 2 in order to retrim it on the basis of said actual position determined by the detection means 11 and a reference position of said control 2 corresponding to the retrimmed position thereof with regards to keeping said flight parameter at said reference value. This reference position may be determined either by the calculation unit 12 on the basis of information received from the automatic pilot 6 or by said automatic pilot 6 which transmits it to said calculation unit 12; and a display means 15, connected by a link 16 to the calculation unit 12 and capable of displaying to the pilot of the aircraft at least one characteristic sign 17, 18 indicating the direction and magnitude of the displacement of the control 2 needed in order to retrim it.

Thus, by virtue of the device 1 according to the invention, the pilot of the helicopter He knows precisely the direction and magnitude of the displacement needed to retrim the control 2 with a view to reducing the authority demanded of the flight-assistance system 5, which allows precise and quick retrimming to be performed.

In addition, this retrimming which is performed simply by a manual displacement of the control 2 requires only a small amount of work on the part of the pilot.

What is more, because of its aforementioned mode of action and, in particular, because of the absence of motorization, the risk of breakdown, the bulk and the cost of the device 1 according to the invention are very low.

Said device 1 may be applied to any type of flight-control device 3 and, in particular, to a device 3 without a system for the motorized displacement of the control, or to a device whose existing system is broken down or can no longer be operated.

In a particular embodiment which has not been depicted, the calculation unit is integrated into the flight-assistance system and, in the case of a system 5 which has an automatic pilot 6, is incorporated directly into the latter.

According to the invention, the device 1 additionally comprises a means 19, for example integrated into the calculation unit 12 and intended to minimize or even completely inhibit any change in the reference value of said flight parameter during manual action for retrimming the control 2, which makes it possible to prevent a change in flight configuration that the pilot does not desire.

As a preference, said means 19 acts, in order to do this, as illustrated by a link 20 on the algorithm which is provided in the usual way in the automatic pilot 6 for maintaining the prescribed objective, and which is thus temporarily inhibited by action of said means 19.

To this end, the device 1 additionally comprises a detection means 21 for detecting any manual action of retrimming the control 2 taken by a pilot of the helicopter He.

To do this, said detection means 21 may measure or evaluate various types of parameter. However, as a preference, the detection means 21 which is connected by a link 22 to the calculation unit 12 is formed in such a way as to detect, in the usual way, at least one of the following parameters:

- in the case of a control equipped with an anchoring means, not depicted, the angular difference between the actual position and the anchored position of said control;
- the force exerted by a pilot on the control 2; and
- actuation by a pilot of a special-purpose actuating means, not depicted, intended to inform of the taking of manual retrimming action.

In a preferred embodiment, a means 32, triggered by manual retrimming detection, makes it possible to reduce the authority of the stick demanded by the element 6 and performed by the element 7 via the link 8.

In the context of the present invention it is possible to provide two separate detection means, one of which is intended to detect flight-control actions and the other of which is intended to detect retrimming actions.

The retrimming of the control 2 according to the invention is described in greater detail hereinbelow with reference to FIGS. 2A, 2B and 2C which illustrate successive positions of the control 2 during said retrimming.

In FIG. 2A, the control 2 is in a current position, not retrimmed and defined along an axis X—X. According to the aforementioned processing operations, the calculation unit 12 determines that the trimmed position 2A of said control 2, which position is illustrated in broken line, as regards keeping the flight parameter in question at the predefined reference value, is separated from said current position by an angle $\alpha 1$.

The direction and magnitude of displacement of the control 2 to bring it from the current position (in solid line) to the trimmed position 2A (in broken line) are displayed to the pilot by the display means 15 using a screen 23.

For this purpose, said screen 23 has two characteristic signs 17 and 18, namely two arrows, pointing in opposite directions, the direction of the displacement required for the control 2 corresponding to the direction shown by the arrow 18 which is activated.

Activation of a characteristic sign, in this instance an arrow 18, is achieved according to the invention by darkening at least part 18A of its area.

Furthermore, said darkened area 18A is proportional to the magnitude (or to the angle $\alpha 1$) of the displacement required for retrimming.

In consequence, in the position illustrated in FIG. 2A, the control needs to be displaced to the right by an angle $\alpha 1$.

In FIG. 2B, the pilot has begun to retrim by an angle $\alpha 2$.

The control 2 still has to be displaced by an angle $\alpha 3$ illustrated by a smaller darkened area 18A ($\alpha 1 = \alpha 2 + \alpha 3$) to be brought into the trimmed position depicted in FIG. 2C.

When the control 2 is in the position depicted in this FIG. 2C, the retrimming action is complete.

It will be noted that when the control 2 is fitted with a known anchoring means not depicted, the aircraft pilot when retrimming or zeroing the static control of an algorithm for maintaining an objective operates a known device, not depicted, for disengaging the forces so as to displace the anchored position of the control.

Furthermore, in preferred embodiments:

- to avoid systematic display of the retrimming symbols, the display means 15 is formed in such a way as to display the characteristic signs 17 and 18 only when the magnitude (angle $\alpha 1$) of the retrimming displacement exceeds a predefined magnitude; and
- to avoid fleeting displays, said characteristic signs 17 and 18 are displayed only when said predefined magnitude has been exceeded for a predefined length of time, for example five seconds.

What is claimed is:

1. A device for assisting with the retrimming of at least one pilot control of an aircraft comprising a light-control system with which said control can control a controlled member of the aircraft and with which a flight-assistance system connected to said control can determine and apply a command to said controlled member so that an action of said controlled member allows a flight parameter to be kept at a reference value, said device comprising:

at least one first detection means for detecting an actual position of said control;

a calculation unit for determining a direction and magnitude of a displacement of said control, so as to retrim said control on the basis of said actual position detected by the detection means and a reference position of said control, corresponding to said control being in the trimmed position with regards to keeping said flight parameter at said reference value; and a display means for displaying to a pilot of the aircraft at least one characteristic sign indicating a direction and magnitude of a displacement of the control that is needed for retrimming the control.

2. A device as claimed in claim 1, which comprises a means for at least minimizing any change in said reference value of said flight parameter during a manual action of retrimming the control.

3. A device as claimed in claim 1, which comprises a second detection means for detecting any manual action of retrimming of the control taken by a pilot of the aircraft.

4. The device as claimed in claim 3, wherein said control is equipped with an anchoring means and said second detection means detects at least one of the following parameters:

an angular difference between the actual position of said control and an anchored position of said control;

the force exerted by a pilot on the control; and actuation by a pilot of a special-purpose actuating means that indicates a manual retrimming action.

5. A device as claimed in claim 1, which comprises a third means for reducing the authority demanded by the flight-assistance system during a manual retrimming action.

6. A device as claimed in claim 1, wherein said. display means is formed in such a way as to display said characteristic sign only when the magnitude of the retrimming displacement exceeds a predefined magnitude.

7. A device as claimed in claim 1, wherein said display means is formed in such a way as to display said characteristic sign only when the magnitude of the retrimming displacement has exceeded a predefined magnitude for at least a predefined length of time.

8. The device as claimed in claim 1, wherein said display means displays said at least one characteristic sign and another characteristic sign representing two arrows pointing in opposite directions, wherein said arrows can be darkened over a variable area to form a darkened arrow, and wherein only one of said arrows may be darkened at any given time, wherein a direction of the retrimming displacement corresponds to the direction shown by the darkened arrow, and wherein the magnitude of said retrimming displacement is proportional to a darkened area.

9. The device of claim 1, wherein the aircraft is a helicopter.

10. The device as claimed in claim 3, wherein the second detection means detects at least one of the following parameters:

the force exerted by a pilot on the control, and
actuation by a pilot of a special-purpose actuating means that indicates a manual retrimming action.

* * * * *